2,789,129
Patented Apr. 16, 1957

2,789,129

CHLOROPHENOXYALKYL ESTERS OF N-PHENYLCARBAMIC ACIDS

William E. Bissinger, Akron, Ohio, assignor to Columbia-Southern Chemical Corporation, Allegheny County, Pa., a corporation of Delaware No Drawing. Application January 19, 1954,
Serial No. 405,031

6 Claims. (Cl. 260—471)

The present invention relates to a novel class of compounds which are aryloxy alcohol esters of N-phenylcarbamic acids wherein the carbamic acid carboxyl group is esterified with the alcohol.

The compounds comprising the instant class are particular esters of theoretical N-phenylcarbamic acids and are represented by this structure:

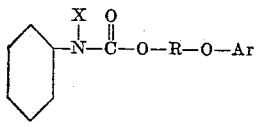

wherein Ar is an aryl nucleus, notably phenyl; X is hydrogen or a monovalent radical including alkyl, alkenyl, alkoxy and aryl groups; R is a divalent aliphatic group, typically an alkylene group. In general, R should contain up to 10 carbon atoms. Both aryl groups in the acid and alcohol portion of the ester may be nuclearly substituted with a variety of monovalent groups including halogens, especially chlorine, and radicals such as alkyl, alkoxy, alkenyl, nitro and cyano. Any combination of one to five such nuclear substituents in each aromatic group is contemplated.

Substitution with various monovalent radicals in the phenyl group present in the acid portion of the radical preferably should be in the meta position, particularly when only a single nuclear substituent is present, or in the 2,5-position if at least two nuclear substituents are present. In the aromatic nucleus of the alcoholic portion of the ester, substitution in the 2,4- or 2,4,5-positions is preferred, particularly when the aromatic group is phenyl.

Particularly suitable compounds are the chlorophenoxyalkyl N-phenylcarbamates such as mono- and polychlorophenoxy alkyl N-phenylcarbamates and chlorophenoxy alkyl N-chlorophenylcarbamates. In general, these special compounds may be considered to be chlorophenoxy alkylol esters of N-phenylcarbamic acids, the carboxyl group of the acid being esterified by the phenoxyalkylol.

Compounds herein contemplated may be prepared by at least two different reactions. One is by equimolecular interreaction of a phenylamine containing at least one active hydrogen on the amino nitrogen with a haloformate, normally a chloroformate, of an chloroaryloxy alcohol such as chlorophenoxyethanol. This reaction proceeds with evolution of hydrogen halide which is removed, usually by binding chemically with a suitable halogen halide acceptor such as sodium hydroxide or the like. The reaction itself proceeds readily in the liquid phase, or at least when the reactants are liquid; temperatures that permit operation in this manner and which are below 45° C., e. g. preferably temperatures of 0° C. to 25° C., are employed.

Incorporation of an inert organic solvent in the reaction medium is also advantageous, facilitating processing as well as agitation of the medium. Inert organic solvents are those which are free from reactive amino and/or hydroxy groups and include benzene, xylene, toluene, halogenated hydrocarbons such as monochlorobenzene carbon tetrachloride, ethylene dichloride, trichloroethylene and perchloroethylene, among others.

Provision of a suitable hydrogen halide removal expedient is preferably accomplished by the presence of an inorganic or organic base. Illustrative inorganic bases include oxides, hydroxides, carbonates and bicarbonates of sodium, calcium, potassium, barium, strontium and magnesium. Generally these inorganic bases are incorporated in the reaction mixture as aqueous solutions or dispersions of finely divided particles as their solubility permits. Organic bases such as pyridine, quaternary ammonium bases typical of which is trimethyl phenyl ammonium hydroxide, and the like also serve the purpose. Even the phenylamine reactant can serve in such capacity by formation of its hydrohalide; this, however, necessitates using large excesses of this reactant, on the order of double the stoichiometric quantity.

The second process for preparation of these compounds involves equimolecular reaction of a phenylisocyanate and an aryloxy alcohol, usually at elevated temperatures, e. g. 80° C. to 120° C. and often at reflux. Inert organic solvents such as described in connection with the haloformate process may form part of the reaction medium.

Inasmuch as the phenylisocyanates are normally prepared by phosgenation of a phenylamine and the desired haloformates by phosgenation of an aryloxy alcohol, the basic reactants in either of the two processes can be considered as phenylamines and aryloxy alcohols. The phenylamines employed are those wherein the amino nitrogen has at least one active hydrogen linked thereto and the nitrogen is directly attached to a nuclear carbon of the phenyl group.

Typical primary amines are aniline and substituted anilines, such as haloanilines, alkyl substituted anilines and alkoxy substituted anilines, as well as chloroalkyl anilines, chloro-alkoxyanilines, etc. These anilines may contain from 1 to 5 of any combination of these substituents in their rings. Haloanilines, preferably chloroanilines which are employed include the monochloroanilines such as metachloroaniline, parachloroaniline and orthochloroaniline; dichloroanilines including 2,3-dichloroaniline, 2,5-dichloroaniline, 2,6-dichloroaniline; trichloroanilines such as 2,4,5-trichloroaniline, 2,4,6-trichloroaniline, 2,3,4-trichloroaniline; tetrachloroanilines; and pentachloroaniline. The corresponding bromo, fluoro and iodo anilines are also useful. Also, mixed haloanilines, e. g. chlorofluoroanilines, etc. are intended.

Others include alkyl substituted anilines containing from 1 to 5 alkyl groups, said alkyl groups having as many as 20 carbon atoms, such as the toluidines including 3-methylaniline, 4-methylaniline, etc., the xylidines such as 2,3-dimethylaniline, 3,4-dimethylaniline, 3,5-dimethylaniline, 2,6-dimethylaniline, 2,5-dimethylaniline; the trimethyl substituted anilines, for example, pseudocumidine (2,4,5-trimethylaniline) and mesidine; the tetramethyl substituted anilines; pentamethylaniline; the corresponding higher alkyl substituted anilines including ethyl anilines such as ortho, para, and meta ethylanilines, propylanilines, isopropylanilines, etc.

Also alkoxyanilines including the anisidines such as 2-aminoanisole, 4-aminoanisole, 3-aminoanisole; dimethoxyanilines such as 2,5-dimethoxyaniline; other polymethoxy anilines; and corresponding higher molecular weight alkoxyanilines.

Likewise arylamines, especially phenyl amines containing a nuclear cyano substituent such as the mono- and poly-aminobenzonitriles are included, e. g. ortho-, meta- and paraaminobenzonitrile, 2,5-dicyanoaniline, 3,4,5-tricyanoaniline, etc. Those nitroanilines such as metanitroaniline, 2,5-dinitroaniline also are contemplated, Alkenylanilines, e. g. meta-butenylaniline, 2,5-butenylaniline, etc. also are included. In the case of alkoxy, alkyl and alkenyl anilines, replacement of one or more hydrogens, with a halogen, typically chlorine, is part of the invention.

Phenyl amines substituted in their ring with two or more different halogens, alkyl, cyano, nitro, alkenyl and alkoxy groups in any combination are contemplated. Thus, halo-, alkyl-anilines such as 4-amino-3-chlorotoluene; 2-amino-4-chloro-toluene, as well as those halo-alkylanilines containing longer alkyl chains and other halogen atoms, e. g. bromine, are useful. Similarly, halo-alkoxyanilines, alkyl-alkoxy-anilines, aminohalobenzonitriles and nitro-alkyl anilines are within the scope of this invention. Also alkylanilines and alkoxyanilines wherein the various alkyl and alkoxy groups contain carbon chains of different lengths are used, as for example 4-methyl, 5-ethylaniline, etc.

Secondary phenyl amines include diphenyl amine as well as alkenyl and alkyl anilines such as N-methyl aniline, N-ethyl aniline, N-propyl aniline, N-butyl aniline, N-butenyl aniline, etc. Also halogens such as chlorine are substituted for a hydrogen in the alkyl and alkenyl groups, and in the case of alkenyl groups, also halogen addition products thereof, are included. As in the case of primary amines, the ring may contain in any combination from 1 to 5 of one or more halogen atoms, alkyl, cyano, nitro and alkoxy groups. Secondary phenyl amines corresponding to the aforeenumerated substituted primary phenyl amines may be used.

Chloroaryloxyalcohols which are employed have the following general structure:

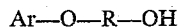

wherein Ar is an aryl group such as naphthyl or preferably chlorophenyl and R is a divalent group, notably an aliphatic carbon chain such as an alkylene group. These alcohols may be considered to be hydroxy ethers of chlorophenols wherein the nuclear OH group of the phenol is etherified.

Preferred aryloxyalcohols include those nuclear chlorophenoxy alcohols which are nuclear chlorinated phenoxymethanol, phenoxyethanol, phenoxyisopropanol, the phenoxybutanols, the phenoxyamylols, and the phenoxydecanols typical of which are mono- and poly-chlorophenoxy alcohols including 4-chlorophenoxy, 2,4-dichlorophenoxy, and 2,4,5-trichlorophenoxy alcohols; also included are those chlorophenoxy alcohols containing other nuclear substituents such as alkyl, and alkoxy, substituents such as 2-chloro-4-methylphenoxy, 2,4-dichloro-5-ethoxy-phenoxy, etc.

As indicated, those phenoxyalcohols, and especially the phenoxyalkylols, wherein nuclear substitution is in the 4-position, or in the 2,4- or 2,4,5-positions in the case of polysubstitution are highly desirable. It is also advantageous to provide phenoxy alcohols wherein R in the preceding formula is aliphatic, notably an aliphatic hydrocarbon chain or halosubstituted aliphatic hydrocarbon chain such as is provided by replacement of one or more hydrogens with a holgen as chlorine.

These aryloxyalcohol esters of N-phenylcarbamic acids are useful as herbicides, generally as weed killers. The phenoxyalkylol esters of N-phenylcarbamic acids including nuclear substituted phenoxyalkylol esters are particularly valuable in this regard. In practice such esters are formulated, usually with an inert carrier, to provide herbicidal compositions containing a herbicidal concentration of the active ester for use in the field. Such concentration of active ingredient usually is between 0.5 and 25 or 30 percent of the field applied composition. The actual concentration within such range being such that the danger of overdosages from inaccurate applications due to equipment and personnel limitations is minimized.

Liquid compositions are provided by dissolving the ester in an inert organic liquid solvent among which are water immiscible benzene, xylene, toluene and other hydrocarbon and halogenated hydrocarbon solvents, generally having a density less than that of water; also water miscible solvents such as alcohols, ketones and ethers typically used as industrial solvents. With water immiscible solvents, recognized wetting agents or surface active agents such as sodium alkylaryl sulfonates may be added so as to provide an emulsifiable aqueous system of reasonable stability. In the case of water miscible solutions, aqueous solutions are provided merely by addition of water.

Solid formulations as dusts are prepared by admixing the ester with inert solid diluents, for example, by coating absorptive inert finely divided material such as finely divided absorptive silica with the ester. Such coated material may be further diluted by blending with talc, clay, wood particles, flour, finely divided silicates, diatomaceous earths, chalk and the like. Another expedient for providing solid formulations of this general character involves grinding and mixing the ester and diluent in a hammer mill.

The following examples illustrate the manner in which the contemplated compounds may be prepared:

*Example I*

Into a 500 cubic centimeter, 1-necked, round-bottomed flask was charged 145.9 grams (0.705 mole) 2,4-dichlorophenoxyethanol and 84.0 grams (0.705 mole) phenyl isocyanate. A six inch open tube packed with Drierite, a moisture absorbent, was placed in the neck of the flask, and a thermometer was disposed in the flask's thermowell. Thereafter the flask's contents were heated and swirled until they melted to give a refractive index of $n_D^{20}$ 1.5884. This was followed by prolonged heating at from 90–95° C. until the refractive index of the contents was $n_D^{20}$ 1.5942 and remained constant, a period of about 20 hours being employed. The product then was dissolved in 250 cubic centimeters of benzene and allowed to cool to room temperature. Solids which thusly separated were filtered and washed by reslurrying with petroleum ether.

After drying in a vacuum desiccator to constant weight, the filtered solids weighed 156.8 grams. This product was a light brown, granular, wax-like solid melting at 93–96° C. It was β-(2,4-dichlorophenoxy) ethyl N-phenylcarbamate and had the structure:

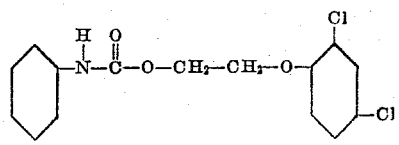

By analysis it contained 4.5 percent nitrogen; 19.2 percent chlorine, 13.5 percent $CO_2$.

*Example II*

Following the procedure of Example I using the tabulated reactants provides other esters of this invention:

| Isocyanate | Phenoxyalcohol | Product |
|---|---|---|
| metachlorophenyl | 2,4-dichlorophenoxyethanol. | β-(2,4-dichlorophenoxy) ethyl N-3-chlorophenylcarbamate. |
| metamethylphenyl | 2-chlorophenoxymethanol. | 2-chlorophenoxymethyl N-3-methylphenylcarbamate. |

While the invention has been described with reference to specific details of certain embodiments thereof, it is not intended that the invention be limited thereto except insofar as they appear in the appended claims.

I claim:
1. A polychlorophenoxy alkyl N-phenylcarbamate, said alkyl group containing up to 10 carbon atoms.
2. A β-(2,4-dichlorophenoxy) alkyl N-phenylcarbamate said alkyl group containing up to 10 carbon atoms.
3. β-(2,4-dichlorophenoxy) ethyl N-phenylcarbamate.
4. A beta-(polychlorophenoxy)ethyl N-chlorophenylcarbamate.
5. A beta-(dichlorophenoxy)ethyl N-chlorophenylcarbamate.
6. A beta-(dichlorophenoxy)ethyl N-metachloro-phenylcarbamate.

References Cited in the file of this patent

UNITED STATES PATENTS

| 2,573,420 | Engel et al. | Oct. 30, 1951 |
| 2,634,289 | Butler | Apr. 7, 1953 |

OTHER REFERENCES

Beilstein Handbuch, 12, 332 (1929), 1st. Suppl. 226–7 (1933), 2nd Supp. 198 (1950).

Thompson et al.: Botanical Gazette, 107, 490 to 506 (1946).